Figure 1:
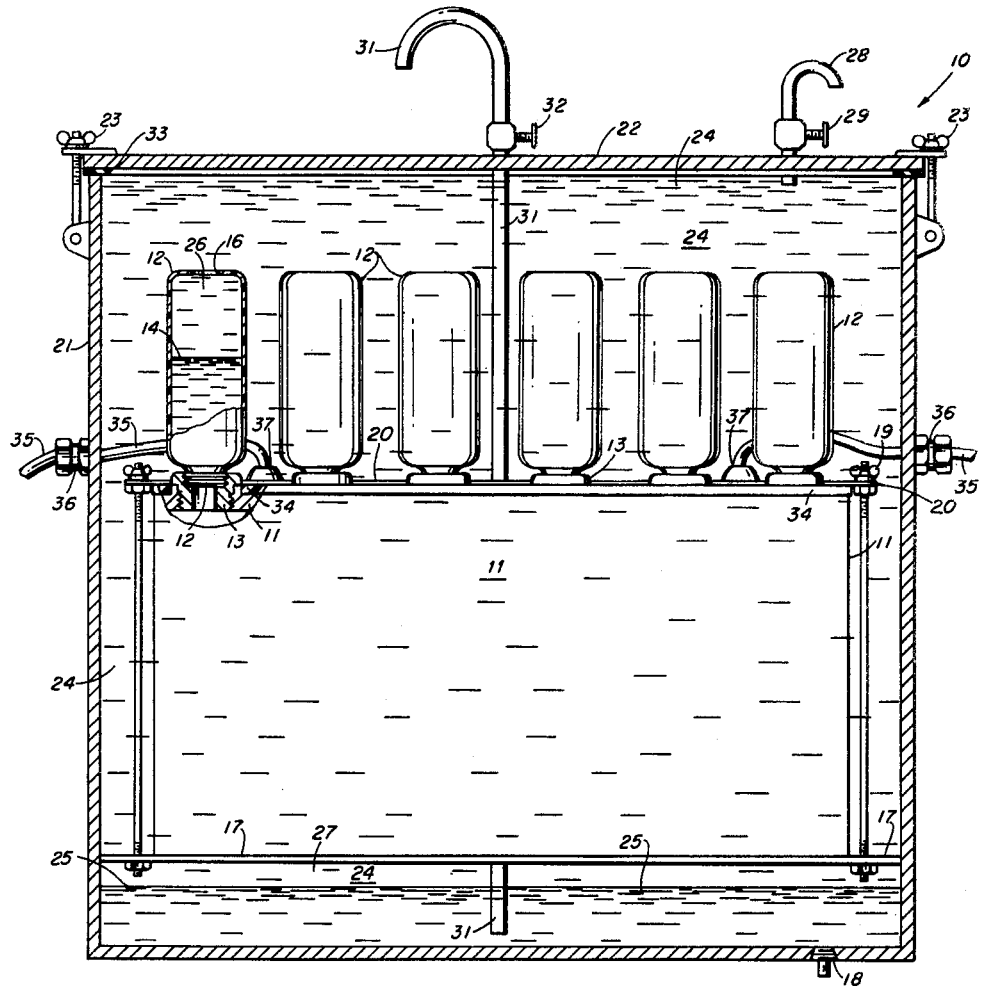

Dec. 8, 1964     W. E. HUTCHISON ETAL     3,160,525
DEEP SUBMERGENCE POWER SUPPLY
Filed July 11, 1961

INVENTORS
WILLISTON E. HUTCHISON
CHARLES R. HILL
BY

*ATTORNEYS*

3,160,525
DEEP SUBMERGENCE POWER SUPPLY
Williston E. Hutchison, 7945 Michelle Drive, La Mesa, Calif., and Charles R. Hill, 4629 Green St., San Diego, Calif.
Filed July 11, 1961, Ser. No. 123,325
9 Claims. (Cl. 136—6)
(Granted under Title 35, U.S. Code (1952), sec. 266)

The invention described herein may be manufactured and used by or for the Government of the United States of America for governmental purposes without the payment of any royalties thereon or therefor.

This invention relates to underwater electrical power supplies and more specifically to an apparatus and method for adapting a standard liquid electrolyte battery for use as a power source when submerged to depths of several miles in the ocean.

Deep exploration in the sea has been greatly handicapped by available power supply. In the case of the Bathyscaph Trieste, the only power available had to be carried inside the pressure-proof sphere, the limited space where the operators are housed. Even power cables from the tender or surface ship would have been too long and heavy to be practical or feasible. A silver cell battery free from serious gas discharge had been used successfully on several dives but due to the limited space and power, in addition to the original cost and recharging expense, made any improvement desirable and necessary, scientifically. The general object of the proposed invention is to eliminate the foregoing and related disadvantages and provide an improved submerged battery power supply.

Starting with a desire to use a standard low-priced storage battery and adapt it to the particular use, the proposed submerged power supply resulted. By moving the batteries out of the operators' compartment of a submarine and mounting them in a specially sealed container on deck, more space for instrumentation and operation has been provided in the submarine while concurrently increasing the power supply.

The general object of the invention is to provide an apparatus and method for housing a standard electrolytic storage battery and adapt it for operation as a power supply when submerged even to depths of several miles in the ocean such as in the Mariana Trench.

Another object is to provide a submersible sealed container equipped with storage batteries and provided with novel means for assuring normal battery operation at extremely high pressures.

Still another object is to provide means for functionally handling the electrolyte of a storage battery when the batteries are submerged in a dielectric oil within a sealed container.

Another object is to provide means for equalizing the internal and external pressure of a container equipped with electrolytic type storage batteries surrounded with a dielectric oil when the container is subjected to pressures of hundreds of atmospheres.

A further object is to provide an apparatus for operably housing a standard storage battery whereby the pressures inside and outside the battery casing are equalized and the battery will remain operable at pressures in excess of 15,000 pounds per square inch.

The special purpose of this invention is its use as a power supply unit capable of being installed on the deck of any underwater craft such as a submarine. Other uses such as an expendable sonar detection device or undersea weapon are anticipated wherein the power supply and electronic gear could be dropped in a harbor entrance for monitoring passing ships so long as the battery charge remained operable. It is believed that this improved type of submerged battery power supply will advance the art in the sound beacons, lighting underwater photography, communication and exploration equipment.

Figure 2:
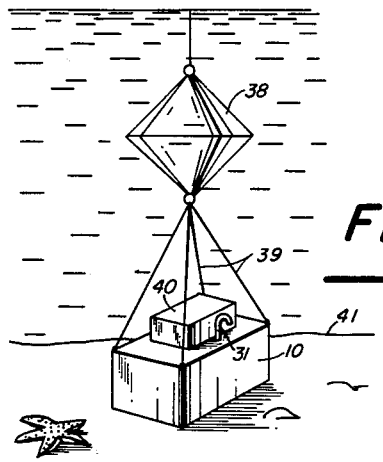

With these and other objects in view, as will hereinafter more fully appear, and which will be more particularly pointed out in the appended claims, reference is now made to the following description taken in connection with the accompanying drawings in which:

FIG. 1 is a front elevation partially in section of a submergible liquid-electrolyte type battery power supply; and FIG. 2 is a submergible power supply carrying a signalling device and deposited in an upright position on the ocean floor by a floating buoy.

In detail, the power pack 10 used as a power supply when submerged at great depths in the ocean, consists mainly of a storage battery 11 preferably of the acid electrolytic type, equipped with resilient electrolyte reservoirs 12 connected to each battery cap 13 and partially filled with electrolyte or distilled water 14. A vent or filler hole 16 is provided in the top of each reservoir 12. The battery 11 is supported on a grill 17 spaced above the bottom of the housing or sealed container 21 so that an area 27 is provided as salt water surge tank section for receiving the salt water 25 and preferably maintaining it out of contact with the bottom of the battery box 11. If the battery box is made of a material unaffected by salt water and the battery top and leads are well insulated, the rise in the salt water level to the top of the battery will not affect its operation. Nevertheless, it is preferred to provide a large surge tank area 27 in the bottom of the container 21 as a safety factor and maintain the battery 11 out of contact with the salt water admitted into the container 21 during pressure equalization. A plug 18 is provided in the bottom of the container 21 for draining the container. After the battery is secured by the bolts and wing nuts 19 and the strap 20 to the grill 17, the housing or container 21 is filled with a dielectric or transformer oil 24.

As illustrated in FIG. 1 the dielectric oil 24 completely surrounds the battery 11 and electrolyte reservoirs 12. In fact, the oil actually enters the reservoirs 12 through the vents 16 so that the upper part of the reservoir or void is filled with the dielectric oil indicated by numeral 26 and rests on top of the electrolyte 14. Another detail of the reservoir construction includes the special adapter caps 13 which screw into the battery filler cap openings. The lower end or neck of the bottle shaped reservoirs 12 are designed to screw into the adapter cap 13 to form a tight joint and exclude oil seepage into the battery 11. The reservoirs 12 have preferably been made of an elastic polyethylene plastic although any material is suitable providing it does not react with the electrolyte or dielectric oil.

The battery or power leads 35 run through the stuffing boxes 36 of the container 21 and fastener to the battery terminals 37. The usual bituminous battery top and standard battery lead insulation were found to be weak in withstanding the extreme hydrostatic pressure and reaction of the dielectric oil. To overcome this oil resistant leads 35 such as neoprene were used. A plastic was developed for the top of the battery to provide the coating 34.

The plastic coating 34 consists of an epoxy resin base, sixty percent by weight and modifiers, forty percent by weight. Such a coating was required to withstand the physical and chemical elements and especially the extreme pressure developed or inherent in the operation. The modifiers listed here below produced the preferred plastic although equivalent protective coatings may be employed successfully.

Said coating 34 is formed of the following ingredients by weight:

| | Percent |
|---|---|
| Epoxy resin | 60 |
| Polysulfide rubber | 20 |
| Ethyl mercaptan | 2 |
| Diphenylamine | 10 |
| Diallyl phthalate | 3 |
| Lead oxide | 5 |

The ingredients are mixed together and spread on the top of the battery which has been prepared for confining the plastic compound to the proper areas. While pouring or spreading the compound a warm air blast is generally directed against it to control the uniformity of cover, and assure a protective coating on the oil sensitive bituminous top. The coating is then allowed to stand until polymerized before the battery is employed in the submerged power supply operations.

After applying the plastic coating 34 to the battery top and filling the container 21 with dielectric oil 24 the lid 22 and gasket 33 are tightly secured by the hold-down bolts and wing nuts 23. A gas vent 28 controlled by valve 29 is provided in the lid 22 of the container 21 to permit the escape of gas from the battery, generated particularly during the charging period while at the ocean surface.

A pressure equalization passage in the form of a pipe 31 extending from a point inside the container 21 near the bottom within the salt water surge section 27, to a point external of the container 21 above the lid 22. A valve 32 is provided for controlling the pressure equalization passage 31. In operation the vent valve 29 is closed and the by-pass valve 32 opened as the power pack 10 is prepared for submerging.

As the depth to which the pack is submerged increases and the internal hydrostatic pressure increases as controlled through the passage 31 by the external pressure, the compressibility of the components and any voids in the container 21 permit a limited volume of salt water 25 to enter the salt water surge section 27 in the process of equalization of the internal and external pressures. Therefore, at submarine depths of approximately seven miles the internal pressure on the dielectric oil and electrolyte will be in the neighborhood of 16,000 pounds per square inch and even so, this extreme pressure has not hindered the operation of the proposed battery power pack. Therefore, the combination provides a power source that may be fastened outside on the deck of a submarine, thus, saving critical cargo space within the submarine during diving operation.

FIG. 2 is a modification of the basic power pack, designed as an expendable sonar unit for monitoring harbor channels and the like. In the modified design since recharging will not be required, the electrolyte reservoirs may be made without vent 16 and the container gas vent 28 and the control valve 32 on pressure equalizing passage 31 may be eliminated. Any suitable sonar device 40 for generating and monitoring sound pulse underwater is fastened to the top of the power supply container and electrically connected to it. The pressure equalizing connection 31 extends from a point above the top and external of the container, to a point internal and near the bottom, similar to the cross-section shown in FIG. 1. Any suitable guiding or submerging means for keeping the power pack in its normally upright position, such as mounting it on the deck of a submarine may be used. In FIG. 2 a float or buoy 38 is shown attached to the independent power pack 10 by lines 39 to keep the pack in its correct position. The power pack 10 may be submerged by a line, sea anchor or any suitable means for keeping it level and guide it to the bottom or ocean floor 41.

Obviously many modifications and variations of the present invention are possible in the light of the above teachings. It is therefore to be understood that within the scope of the appended claims the invention may be practiced otherwise than as specifically described.

What is claimed is:

1. A submersible power supply adapted to be immersed in a water medium in immediate contact therewith and to operate over a wide range of depths, up to and including great depths, in said water medium, comprising:
   (a) a watertight housing;
   (b) a liquid-electrolyte multi-cell battery, disposed in fixed position within said housing with the bottommost part of said battery being significantly spaced from the bottommost portion of said housing, the intervening space defining a surge tank area;
   (c) said liquid-electrolyte battery comprising a plurality of individual cells and having a top, a bottom and a plurality of sides, the top of said battery being provided therein with a plurality of openings at least one of which is associated with each of said individual cells;
   (d) a plurality of liquid-electrolyte reservoirs mounted atop said liquid-electrolyte battery, each of said reservoirs being in fluid communication with one of said battery cells by way of one of said openings in the top of said battery, each of said liquid-electrolyte reservoirs having an opening in its uppermost end;
   (e) electrolyte liquid, respective parts of which completely fill the various cells of said battery and respective parts of which fill a substantial portion of each of the various electrolyte reservoirs, the electrolyte liquid in each of said plurality of electrolyte reservoirs being in free fluid exchange with the electrolyte liquid in its associated battery cell;
   (f) dielectric liquid, characterized by a specific gravity which is less than the specific gravity of said outside water medium and which is also less than the specific gravity of said electrolyte liquid, filling the balance of each of said reservoirs which is not filled by said electrolyte liquid and filling the otherwise-void spaces within said housing;
   (g) pressure-equalizing means, passing into said housing in watertight connection therewith, for establishing dynamic pressure equalization between the external water medium in which said power supply is immersed and the liquid aggregate present within said housing; and
   (h) a pair of electrical conduction means, one of which is connected to each of the respective poles of said battery, and which are adapted to interconnect to a pair of power leads which are external to said housing, for transporting electrical power to said power leads and any power consumer to which said power leads run.

2. The submersible power supply of claim 1 wherein said pressure-equalizing means comprises a conduit means for permitting free flow of the outside water medium into and out of said housing while at the same time preventing outward flow from said housing of any significant portion of said dielectric liquid present within said housing while said housing is substantially in its upright position.

3. The submersible power supply of claim 2 wherein said conduit means has a substantially vertically-disposed lower portion which is located within said housing and which extends from the top of said housing to said surge tank area and an upper portion which is substantially without said housing and which at its upper end has a substantially inverted-U-shape configuration, said lower and said upper portions of said conduit means forming a continuous fluid passageway.

4. The submersible power supply of claim 3 wherein the lower portion of said conduit means extends to almost the bottom of said housing.

5. The submersible power supply of claim 2 wherein said conduit means is open-ended and, as viewed with said housing in its normal upright position, comprises:
 (a) a substantially vertically-disposed lower portion disposed within said housing and which extends to said surge tank area; and
 (b) an upper portion, continuous with said lower portion and which extends out of said housing into said water medium, said upper portion having therein a configuration which requires that any fluid which passes from said housing into said water medium by way of said conduit means must somewhere in its path through said upper portion travel in the direction of gravity when said housing is in its substantially upright position, whereby to prevent any significant loss from said housing of said dielectric liquid when said housing is in its normal upright position.

6. The submersible power supply of claim 5 wherein said upper portion of said conduit means has at least in part a substantially vertically-disposed inverted-U-shape configuration as viewed with said housing in its normal upright position.

7. A submersible power supply, adapted to be immersed in a water medium in immediate contact therewith and to operate over a wide range of depths, up to and including great depths, in said water medium, comprising:
 (a) a watertight housing;
 (b) a liquid-electrolyte battery disposed in fixed position within said housing, said battery comprising at least one cell and having a top, a bottom, and a plurality of sides, the top of said battery being provided therein with an opening associated with said cell;
 (c) a liquid-electrolyte reservoir mounted atop said battery in fluid communication with said battery cell by way of said opening in the top of said battery, said liquid-electrolyte reservoir having an opening in its uppermost end;
 (d) electrolyte liquid, part of which completely fills said battery cell and part of which fills a substantial portion of said electrolyte reservoir;
 (e) dielectric liquid, characterized by a specific gravity which is less than the specific gravity of said outside water medium and which is also less than the specific gravity of said electrolyte liquid, filling the balance of said reservoir which is not filled by said electrolyte liquid and filling the otherwise-void spaces within said housing;
 (f) pressure-equalizing means, passing into said housing in watertight connection therewith, for establishing dynamic pressure equalization between the external water medium in which said power supply is immersed and the liquid aggregate present within said housing; and
 (g) a pair of electrical conduction means, one of which is connected to each of the respective poles of said battery, and which are adapted to interconnect to a pair of power leads which are external to said housing, for transporting electrical power to said power leads and any power consumer to which said power leads run.

8. The submersible power supply of claim 7 wherein said pressure-equalizing means comprises a conduit means for permitting free flow of the outside water medium into and out of said housing while at the same time preventing outward flow from said housing of any significant portion of said dielectric liquid present within said housing while said housing is substantially in its upright position.

9. The submersible power supply of claim 8 wherein said conduit means has a substantially vertically-disposed lower portion which is located within said housing and which extends from the top of said housing to said surge tank area and an upper portion which is substantially without said housing and which at its upper end has a substantially inverted-U-shape configuration, said lower and said upper portions of said conduit means forming a continuous fluid passageway.

References Cited by the Examiner
UNITED STATES PATENTS

| | | | |
|---|---|---|---|
| 1,426,337 | 8/22 | Sperry | 136—171.5 |
| 2,055,645 | 9/36 | Allen | 136—177.51 |
| 2,692,907 | 10/54 | Wallace | 136—133 X |
| 2,857,448 | 10/58 | Gill | 136—170 X |
| 2,930,828 | 3/60 | Herold | 136—181 X |

JOHN H. MACK, *Primary Examiner.*

JOHN R. SPECK, *Examiner.*